(12) United States Patent
Desjardins

(10) Patent No.: US 10,840,521 B2
(45) Date of Patent: Nov. 17, 2020

(54) HUMIDIFIER, FOR EXAMPLE FOR A FUEL CELL

(71) Applicant: Mann+Hummel GMBH, Ludwigsburg (DE)

(72) Inventor: Michael Desjardins, Schoolcraft, MI (US)

(73) Assignee: MANN+HUMMEL GmbH, Ludwigsburg (DE)

( * ) Notice: Subject to any disclaimer, the term of this patent is extended or adjusted under 35 U.S.C. 154(b) by 0 days.

(21) Appl. No.: 14/983,675

(22) Filed: Dec. 30, 2015

(65) Prior Publication Data

US 2017/0279138 A1 Sep. 28, 2017

(51) Int. Cl.
*H01M 8/04* (2016.01)
*H01M 8/04119* (2016.01)
*B01D 63/08* (2006.01)
*B01D 61/00* (2006.01)
*B01D 53/26* (2006.01)

(Continued)

(52) U.S. Cl.
CPC ...... *H01M 8/04141* (2013.01); *B01D 53/268* (2013.01); *B01D 61/00* (2013.01); *B01D 61/368* (2013.01); *B01D 63/082* (2013.01); *B01D 63/085* (2013.01); *B01D 69/02* (2013.01); *H01M 8/04119* (2013.01); *H01M 8/04126* (2013.01); *H01M 8/1093* (2013.01); *B01D 2313/086* (2013.01); *B01D 2325/02* (2013.01); *B01D 2325/20* (2013.01); *H01M 2008/1095* (2013.01)

(58) Field of Classification Search
CPC ......... H01M 8/04126; H01M 8/04141; H01M 8/1093; H01M 8/04119; H01M 2008/1095; B01D 69/02; B01D 63/082; B01D 61/368; B01D 53/268; B01D 2325/02; B01D 2325/20
See application file for complete search history.

(56) References Cited

U.S. PATENT DOCUMENTS 5,348,691 A * 9/1994 McElroy ............ F24F 3/14
                                         261/36.1
5,595,690 A * 1/1997 Filburn ............. F24F 6/04
                                         261/104
(Continued)

FOREIGN PATENT DOCUMENTS

DE      202012004927 U1 *  8/2013  ........ H01M 8/04149
DE      102013208877 A1 * 11/2013  ........ H01M 8/04149

*Primary Examiner* — Stephen Hobson

(57) ABSTRACT

A humidifier comprises hollow shell and humidifier core. The humidifier core includes a transfer sheet, a plurality of first channels, and a plurality of second channels. The transfer sheet comprises a permeable material having a plurality of sections and a plurality of layers of spacing materials. The plurality of first channels are configured to allow air flow in a first direction and to prevent airflow in a second direction that is different from the first direction. The plurality of second channels are configured to allow air flow in the second direction and to prevent airflow in the first direction. The humidifier comprises a stack of alternating first channels and second channels, and the first channels are configured to transfer liquid from air flowing in at least one of the first channels to air flowing in at least one of the second channels. The humidifier is suitable for use in fuel cell stack.

15 Claims, 10 Drawing Sheets

(51) Int. Cl.
  *B01D 61/36* (2006.01)
  *B01D 69/02* (2006.01)
  *H01M 8/1086* (2016.01)
  *H01M 8/1018* (2016.01)

(56) References Cited

U.S. PATENT DOCUMENTS

| | | | | |
|---|---|---|---|---|
| 5,624,610 | A * | 4/1997 | Yokoya | F24F 3/1417 261/104 |
| 6,066,408 | A * | 5/2000 | Vitale | F28D 9/0075 429/413 |
| 6,536,514 | B1 * | 3/2003 | Sugiyama | F24F 3/147 165/166 |
| 8,607,851 | B2 * | 12/2013 | Takada | F24F 3/147 165/166 |
| 8,784,542 | B2 * | 7/2014 | Dullaert | B01D 39/1623 210/489 |
| 8,877,393 | B2 * | 11/2014 | Takeuchi | H01M 8/04089 429/413 |
| 8,999,599 | B2 * | 4/2015 | Shintani | H01M 4/88 429/481 |
| 9,196,910 | B2 * | 11/2015 | Yamauchi | H01M 8/0273 |
| 9,203,099 | B2 * | 12/2015 | Illner | H01M 8/04149 |
| 9,240,598 | B2 * | 1/2016 | Martin | H01M 8/0273 |
| 9,358,508 | B2 * | 6/2016 | Wood | B01D 71/06 |
| 9,379,393 | B2 * | 6/2016 | Jang | H01M 8/0206 |
| 9,385,387 | B2 * | 7/2016 | Suzuki | H01M 8/1004 |
| 9,517,433 | B2 * | 12/2016 | Huizing | B01D 53/228 |
| 9,680,169 | B2 * | 6/2017 | Fasold | H01M 8/04149 |
| 2004/0234833 | A1 * | 11/2004 | Hartnack | H01M 8/04119 429/413 |
| 2005/0064261 | A1 * | 3/2005 | Breault | H01M 8/2483 429/414 |
| 2005/0064263 | A1 * | 3/2005 | Goebel | H01M 8/0263 429/514 |
| 2005/0164025 | A1 * | 7/2005 | Simonetti | B01D 67/0016 428/532 |
| 2006/0086125 | A1 * | 4/2006 | Sueoka | F28D 9/0062 62/304 |
| 2006/0228597 | A1 * | 10/2006 | Mossman | B01D 69/02 429/413 |
| 2009/0294548 | A1 * | 12/2009 | Geiger | D06N 3/12 239/6 |
| 2010/0019400 | A1 * | 1/2010 | Robb | H01M 8/04126 261/101 |
| 2012/0137885 | A1 * | 6/2012 | Dullaert | B01D 39/1623 96/12 |
| 2012/0181712 | A1 * | 7/2012 | Vanderwees | H01M 8/04149 261/102 |
| 2012/0308904 | A1 * | 12/2012 | Zhang | H01M 8/04141 429/413 |
| 2013/0101909 | A1 * | 4/2013 | Fasold | B01D 65/003 429/413 |
| 2014/0077402 | A1 * | 3/2014 | Brandt | H01M 8/04149 261/100 |
| 2014/0238235 | A1 * | 8/2014 | Liu | B01D 63/084 95/52 |
| 2015/0017566 | A1 * | 1/2015 | Watanabe | H01M 4/8668 429/480 |
| 2015/0030960 | A1 * | 1/2015 | Martin | H01M 8/0273 429/480 |
| 2015/0171453 | A1 * | 6/2015 | Chikashige | H01M 8/1004 429/450 |
| 2015/0180060 | A1 * | 6/2015 | Purmann | H01M 8/04149 429/413 |
| 2015/0188152 | A1 * | 7/2015 | Mitsuta | H01M 8/0273 429/481 |
| 2015/0228988 | A1 * | 8/2015 | Andreas-Schott | H01M 8/1007 429/457 |
| 2017/0012302 | A1 * | 1/2017 | Enayetullah | H01M 8/248 |
| 2017/0084935 | A1 * | 3/2017 | Desjardins | H01M 8/04141 |
| 2017/0084936 | A1 * | 3/2017 | Amirnasr | H01M 8/04149 |
| 2017/0110744 | A1 * | 4/2017 | Mito | B60K 13/02 |
| 2017/0174800 | A1 * | 6/2017 | Isomura | C08F 212/14 |
| 2017/0279138 | A1 * | 9/2017 | Desjardins | H01M 8/04141 |

* cited by examiner

320

510

510

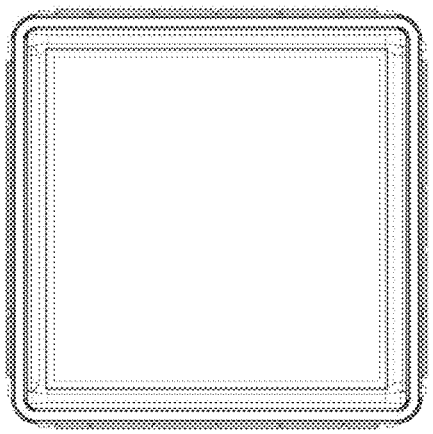
Fig. 6a
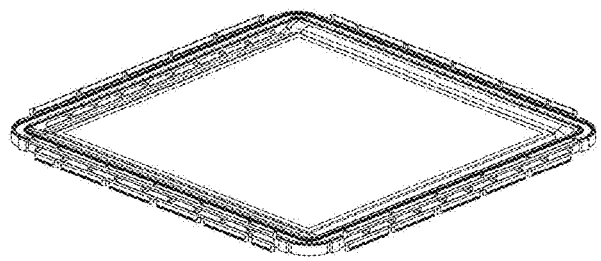
Fig. 6d
Fig. 6b
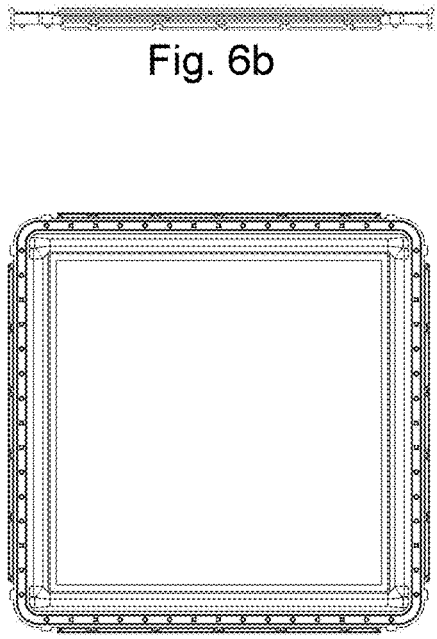
Fig. 6c
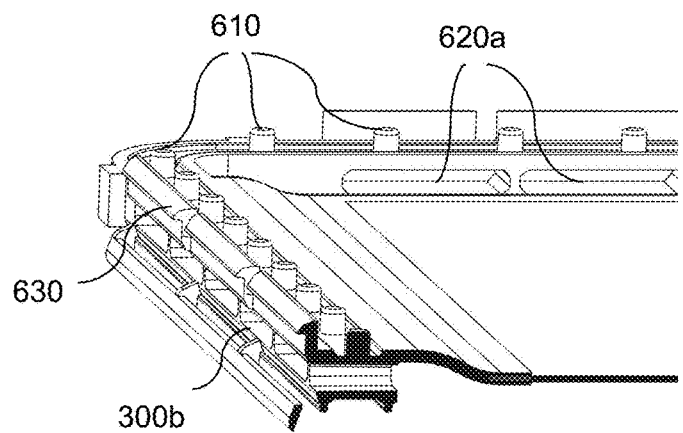
Fig. 6e

330

900

HUMIDIFIER, FOR EXAMPLE FOR A FUEL CELL

TECHNICAL FIELD

The invention relates to a humidifier, for example for a fuel cell.

BACKGROUND

In DE 10 2009 034 095 A1, EP 1 261 992 B1, and U.S. patent application Ser. No. 14/663,504, which is incorporated by reference, humidifiers for fuel cells are described which have a plurality of superimposed membranes which separate flow channels for the feed-through of moist and dry air. Water molecules penetrate the membranes from the moist to the dry air stream which is thus enriched with moisture. The exhaust gas of the fuel cell can be used as moist incoming air stream; the moisture of which exhaust gas is transferred through the membrane into a fresh-air stream which is then fed to the inlet of the fuel cell system in order to generate current in an electrochemical reaction. This is shown in FIG. 1.

SUMMARY

It is desirable to provide a humidifier having an economical design with which moisture is transferable in an efficient manner from a moist to a dry gas stream, wherein the gas streams are separated from one another.

Furthermore, it is desirable to provide a humidifier having that efficiently transfers moister to the dry gas stream while limiting the transfer of gas to the dry gas steam.

In one embodiment, a humidifier core comprises a first end plate, a second end plate, at least one sealing plate, at least one first transfer plate, and at least one second transfer plate. The first end plate has first alignment features and the second end plate has second alignment features. The at least one sealing plate comprises a first porous media over molded with an elastomer seal having alignment holes. The at least one first inlet transfer plate comprises a second porous media over molded with a polymer frame having inlets and outlets for allowing a flow of liquid or gas in a first direction on one side of the porous media. The at least one second transfer plate comprises a second porous media over molded with a polymer frame having These and other features and objects of the invention will be more fully understood from the following detailed description of the embodiments, which should be read in light of the accompanying drawings.

In this regard, before explaining at least one embodiment of the invention in detail, it is to be understood that the invention is not limited in its application to the details of construction and to the arrangements of the components set forth in the description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be used as a basis for designing other structures, methods, and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The accompanying drawings, which are incorporated in and form a part of the specification, illustrate embodiments of the present invention and, together with the description, serve to explain the principles of the invention;

FIGS. 6a-e show an inlet plate of the humidifier stack;

DESCRIPTION

Figure 1:
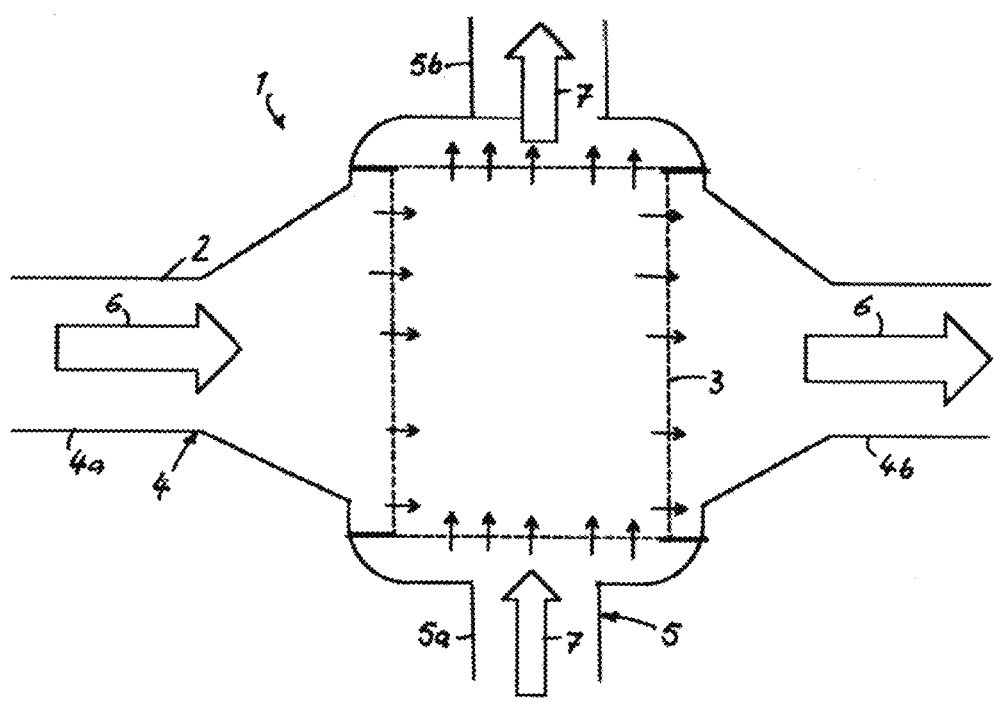
FIG. 1 shows a humidifier for a fuel cell having a cartridge inserted in a housing.

In describing an embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

FIG. 1 illustrates a humidifier 1 for a fuel cell, by means of which fresh air enriched with moisture is fed to the fuel cell, said fresh air having a minimum level of humidity. In a housing 2, the humidifier 1 has a cartridge 3 for transferring the moisture contained in an exhaust gas stream 7 to a dry fresh-air stream 6 which is fed to the fuel cell. The cartridge 3 has a stacking unit with a majority of water-permeable fabric layers stacked one above the other, each separating air streams 6, 7 of different moisture content. The fabric layers separate the air streams from one another and simultaneously allow for a moisture exchange between the air streams 6, 7, and so the dry fresh-air stream 6 absorbs moisture from the moist exhaust gas stream 7.

The housing 2 of the humidifier 1 is provided with a fresh-air channel 4, by means of which ambient air is introduced as fresh-air stream 6. The fresh-air channel 4 comprises a feed section 4a upstream of the cartridge 3 and an outflow section 4b downstream of the cartridge.

The housing 2 is provided with an exhaust gas channel 5 which is offset by an angle of 90 degrees relative to the fresh-air channel 4, and by means of which channel exhaust gases of the fuel cell enriched with moisture are guided through the cartridge as exhaust gas stream 7. The exhaust gas channel 5 has a feed section 5a upstream of the cartridge 3 and an outflow section 5b downstream of the cartridge.

The fresh-air stream 6 and the exhaust gas stream 7 intersect according to the alignment of the channels 4 and 5 at an angle of 90 degrees; however, the air streams 6 and 7 within the cartridge 3 are separated by the water-permeable fiber layers which only allow a water exchange from the exhaust gas stream with high moisture content 7 to the dry fresh-air stream 6.

The two gas streams can be arranged at angles other than the substantially 90 degrees shown in the drawing, e.g. as an arrangement in the counter flow with an angle between the two gas streams of substantially 180 degrees, or other advantageous designs.

Figure 2:
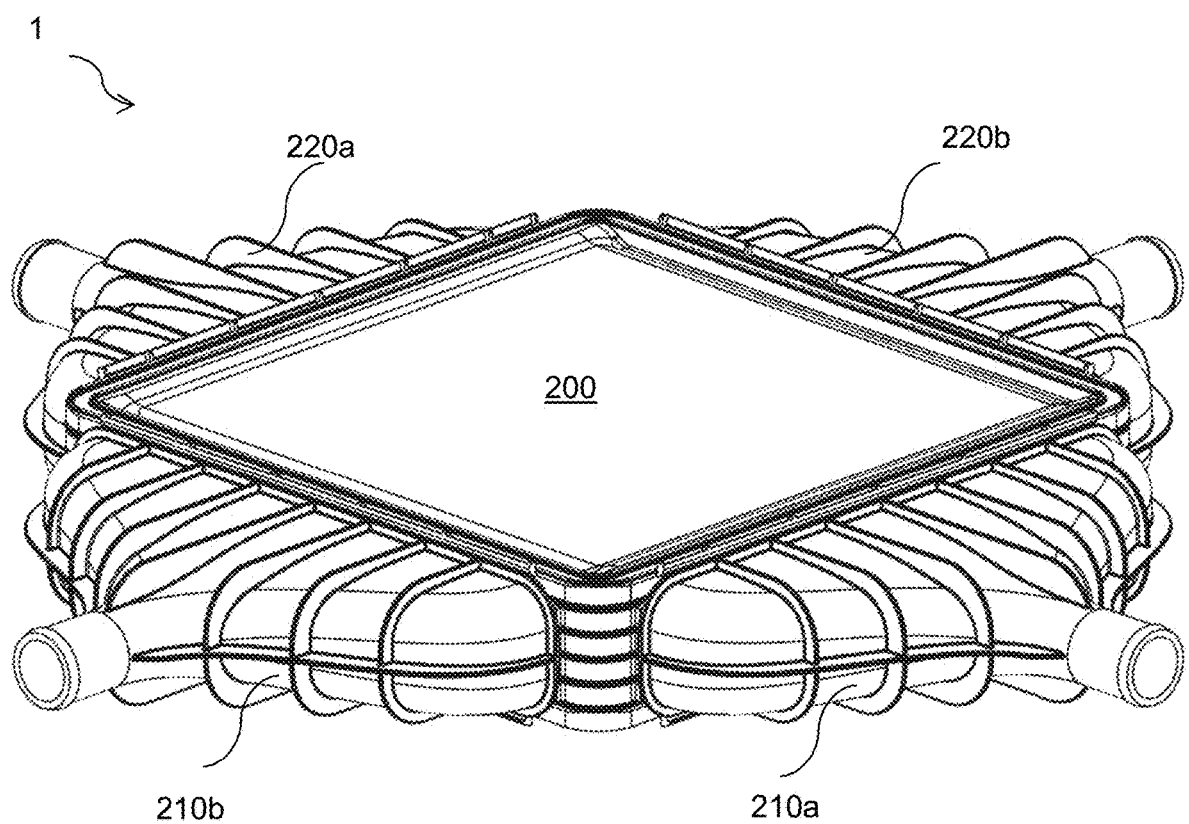
FIG. 2 shows a humidifier for a fuel cell.

FIG. 2 illustrates a fuel cell humidifier 1 having a humidifier stack core 200, two inlet end caps 210a-b, and two outlet endcaps 220a-b. The humidifier stack includes two endplates, at least one transfer plate, and at least two sealing plates. The transfer plate includes first inlets that allow a first airflow enter to enter from a first inlet cap 210a and to flow on a first side of the transfer to a first outlet end cap 220a. The transfer plate includes second inlets that allow a second airflow to enter from a second inlet end cap 210b and to flow on a second side of the transfer plate to a second outlet end cap 220b. The sealing plates prevent the air flow from escaping to other layers of the humidifier stack. The transfer plate comprises a frame and a porous humidifier media. The first airflow is an airflow comprising "dry" air and the second airflow is an airflow comprising "wet" air. Moisture is transferred through the porous humidifier media from the wet airflow to the dry airflow. The features of the humidifier 1 and the humidifier stack core 200 will be described in more details below.

Figure 3A:
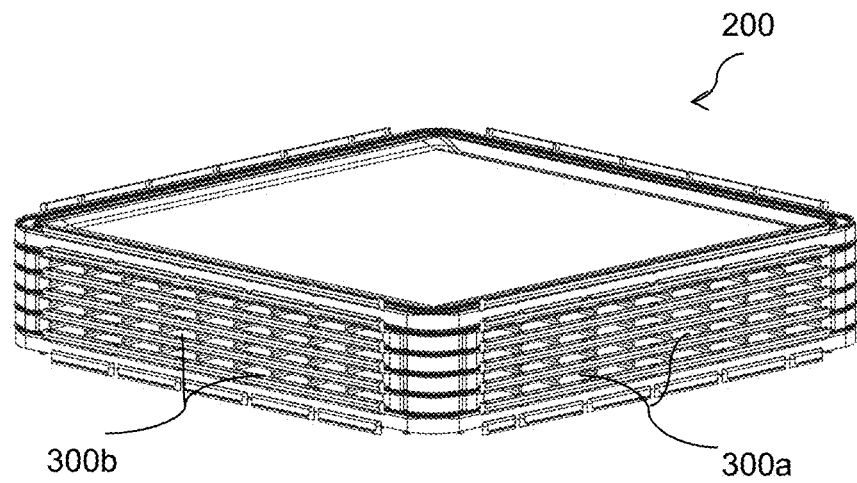
FIG. 3a shows a humidifier stack.

FIG. 3a illustrates the humidifier stack core 200 without the end caps. The humidifier core stack 200 has first inlets 300a allowing airflow to enter the humidifier stack core 200 in a first direction. The humidifier core stack 200 has second inlets 300b allowing airflow to enter the humidifier stack core 200 in a second direction that is substantially perpendicular to the first direction.

Figure 3B:
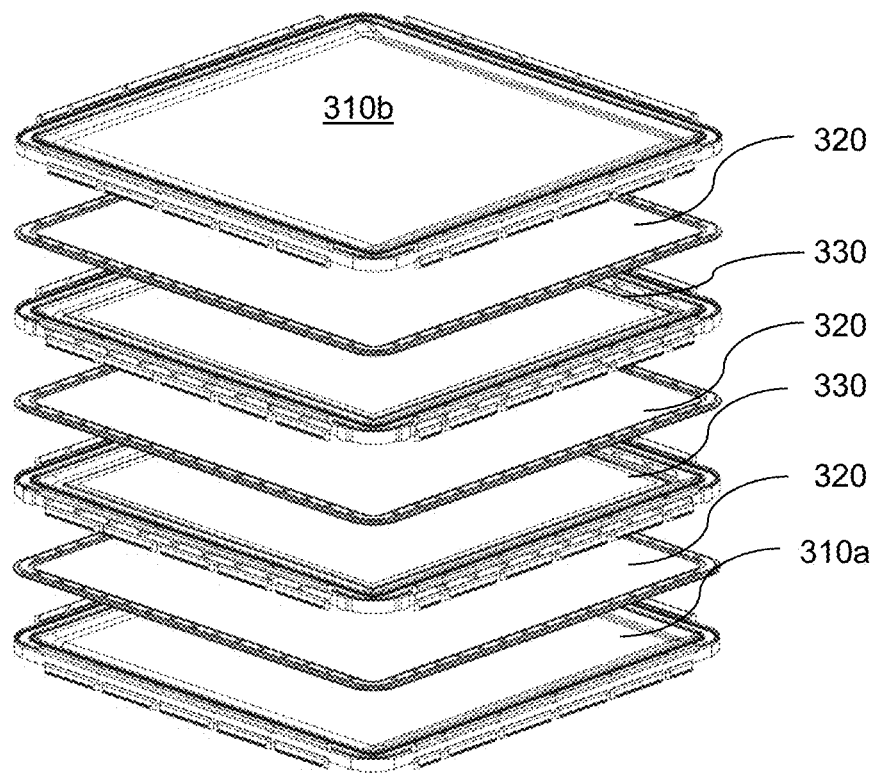
FIG. 3b shows an exploded view of the humidifier stack.

FIG. 3b shows an exploded view of the humidifier cell stack. The humidifier stack includes a bottom end plate 310a, repeating sealing plates 320, and transfer plates 330. As described above, the transfer plates include first inlets 300a that allow airflow along a first side of the transfer plate in a first direction. The transfer plates also include second inlets 310b that allow airflow along a second side of the transfer plate in a second direction. The sealing plates 320 prevent airflow in the first direction of one plate from interfering with airflow in the second direction of another transfer plate.

Figure 4A:
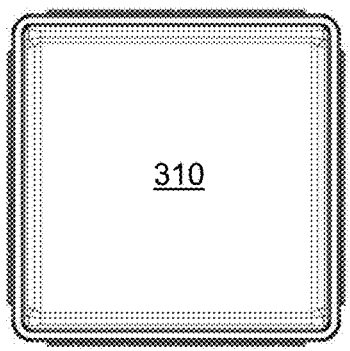
FIGS. 4a-e show an end plate of the humidifier stack.
Figure 4B:
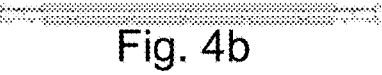
Figure 4C:
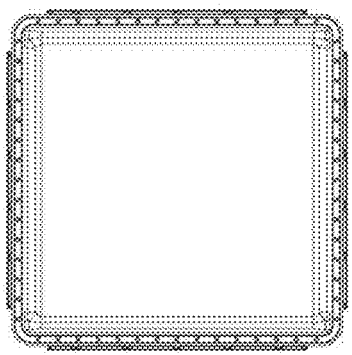
Figure 4D:
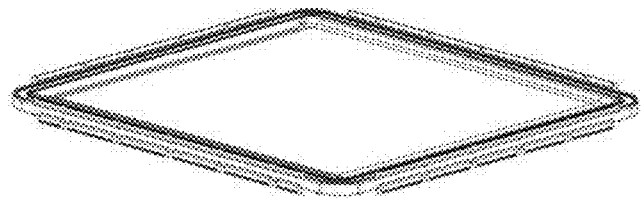
Figure 4E:
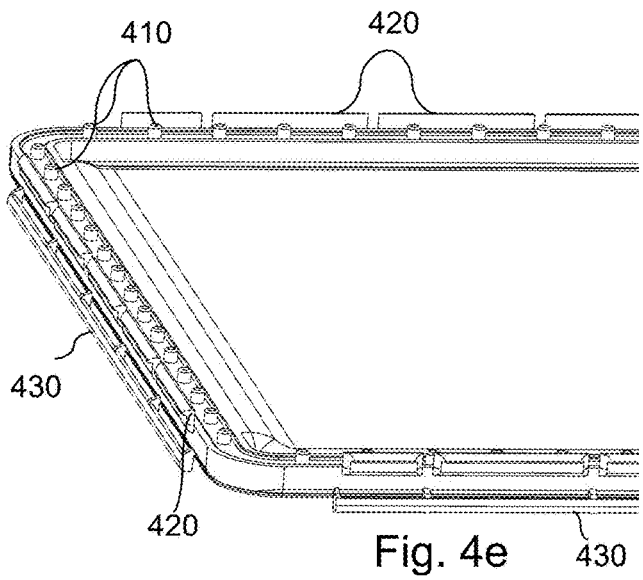

FIG. 4a-e shows the end plates from various views. FIG. 4a shows an exterior side of the end plate 310. The exterior side is the side that is on the outside of the humidifier and is not adjacent to a sealing plate or a transfer plate. The exterior side may be smooth as show, or have a pattern that facilitates proper fit in a vehicle compartment. FIG. 4b shows a side view of the end plate 310. In the illustrated embodiment, the end plate has a substantially uniform thickness. However, in an alternative embodiment not shown, the end plate is thicker in a central portion to provide extra strength and rigidity. FIG. 4c is a top view of an interior side of the end plate. FIG. 4d is another view of the end plate 310. FIG. 4e is an exploded view of the end plate. The end plate includes alignment features 410 that mate to features on the sealing plate 320 and snap features 420 that mate to the inlet plate 330. The end plate also includes rails 430 for facilitating mounting of the end caps 210a-b, 220a-b to the humidifier stack. The end plate comprises a stiff material such as plastic or metal.

Figure 5A:
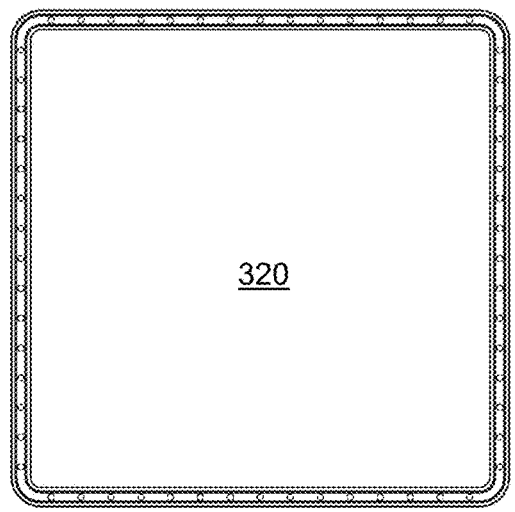
FIGS. 5a-d show a seal plate of the humidifier stack.
Figure 5C:
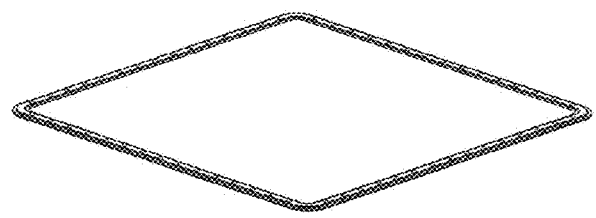
Figure 5B:
Figure 5D:
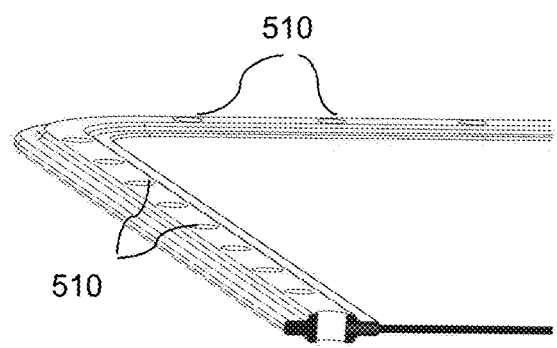

FIGS. 5a-d show the sealing plate 320. Sealing plate 320 comprises a porous humidifier media over molded with a thermoplastic elastomer seal. The sealing plate functions as transfer media and seals in between the transfer plates 330. FIG. 5a shows a top view of the sealing plate. FIG. 5b shows a side view of the sealing plate. FIG. 5c is another view of the sealing plate. FIG. 5d is an exploded cut-away view of the sealing plate. The thermoplastic elastomer seal includes a plurality of alignment holes 510. Alignment holes 510 in the seal act as a mating feature to the inlet plates 330 and end plates 310. Alignment holes 510 also ensure proper assembly while also helping to align and secure the media during the over molding process. The porous humidifier media comprises a media that transfer moisture from a wet side of the media to a dry side of the media. In one embodiment, the porous humidifier comprises a tightly woven cellulose material that absorbs moisture and swells creating a "sealed" state. In another embodiment, the porous humidifier media comprises a layered media having a layer of a nonwoven polyester elastomer sandwiched between two layers of nonwoven cellulose. However suitable media may be used. The important feature of the media is that media blocks transfer of 70% of the air between the dry airstream and the wet airstream, the media allows for sufficient transfer of moisture, and the media has a higher melting point than thermal plastic elastomer seal.

In the embodiment illustrated in FIGS. 5a-d, the top side of the sealing plate is substantially identical to a bottom side of the sealing plate. An advantage of this embodiment is that allows for easier assembly of the humidifier stack. In an alternative embodiment, the bottom side of the sealing plate contains a different pattern of alignment holes than the top side.

FIGS. 6a-e show the transfer plate 330. Transfer plate 330 comprises a porous humidifier media over molded with a thermoplastic polymer frame. FIG. 6a shows a top view of the transfer plate. FIG. 6b shows a side view of the transfer plate. FIG. 6c shows a bottom view of the transfer plate. FIG. 6d is another view of the sealing plate. FIG. 6e is an exploded cut-away view of the transfer plate. The thermoplastic polymer frame includes a plurality of alignment features 610. The alignment features 610 align with the alignment holes 510 to ensure that sealing plate 320 is properly aligned and oriented. The repeating plate has alternating inlets 300b and outlets 620a allowing for flow on both sides of the media to create multiple alternating flow channels when stacked. Snap fit features 630 are configured to allow for the plates to be stacked and fastened together holding tension needed for structural integrity. The porous humidifier media comprises a media that transfer moisture from a wet side of the media to a dry side of the media. In one embodiment, the porous humidifier comprises a tightly woven cellulose material that absorbs moisture and swells creating a "sealed" state. In another embodiment, the porous humidifier media comprises a layered media having a layer of a nonwoven polyester elastomer sandwiched between two layers of nonwoven cellulose. However suitable media may be used. The important feature of the media is that media blocks transfer of 70% of the air between the dry airstream and the wet airstream, the media allows for sufficient transfer of moisture, and the media has a higher melting point than thermal plastic polymer frame.

Figure 7:
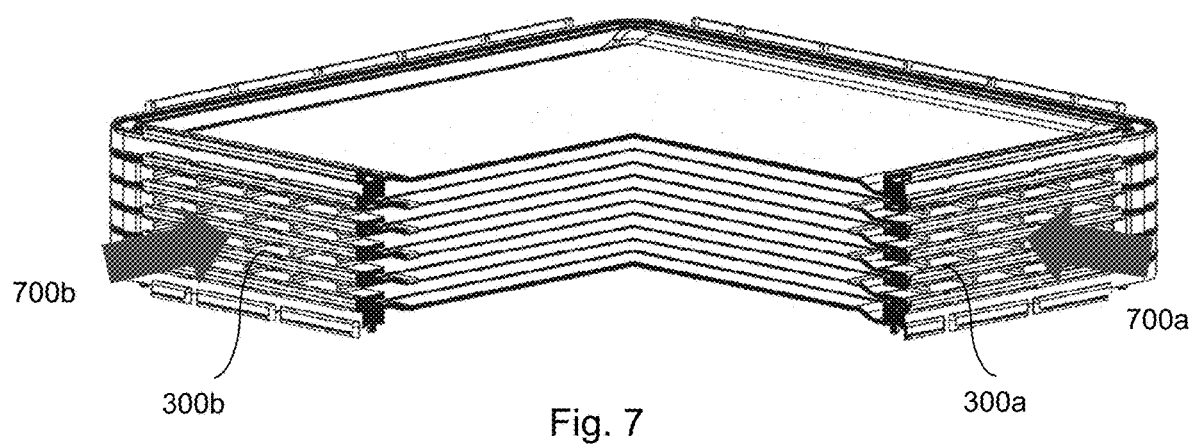
FIG. 7 shows a cut-open view of the humidifier stack.

FIG. 7 is an exploded cut-away view of an exemplary humidifier stack. As described above, the first inlets 300a allow airflow in a first direction 700a along first channels formed in the humidifier stack by the sealing plates and the transfer plates to first outlets. The second inlets 300b allow airflow in a second direction 700b along second channels formed in the humidifier stack by the sealing plates and the transfer plates to second outlets. The sealing plates seal the frames of the transfer plates, preventing air or liquid from escaping the humidifier stack except through the outlets.

Furthermore, the sealing action prevents airflow in the first direction from crossing into channels having airflow in the second direction.

Figure 8:
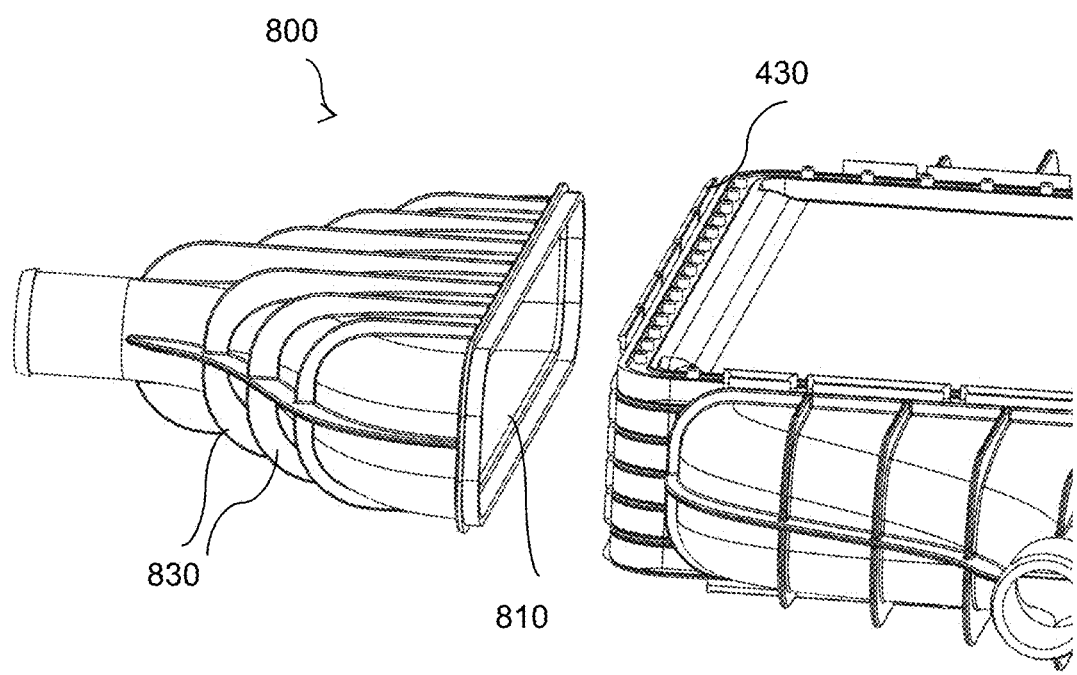
FIG. 8 shows an end cap of the humidifier stack.

FIG. 8 shows an end cap 800 of the humidifier stack and how the end cap fits on the humidifier stack. The end cap 800 includes an opening 810, a port 820, and ridges 830. The opening is sized to fit on a side of the humidifier stack and engages with the rail 430. The end cap is connected to the humidifier stack by a suitable technique such as a welding process. The welding process may include, but is not limited to, hot plate welding, vibration welding, ultrasonic welding, and hot gas welding. The end cap comprises a suitable material such as a polymer, a plastic, or a metal. The ridges provide additional stiffness and structural integrity. In another embodiment, the ridges are omitted because the end cap 800 has sufficient strength and stiffness without ridges. The endcap 800 is suitable as an inlet endcap 210a,b and the port acts as an inlet. The endcap is also suitable as an outlet endcap 220a,b and the port acts as an outlet.

Figure 9A:
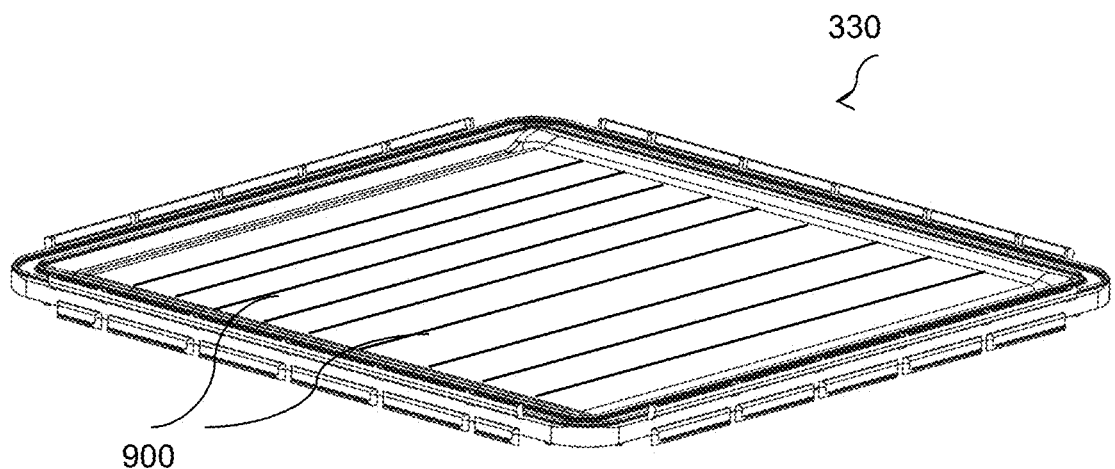
FIGS. 9a,b show embodiments where an inlet plate includes a support member.
Figure 9B:
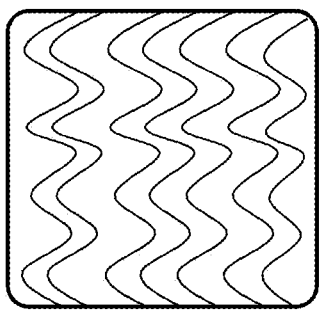

FIG. 9a shows an embodiment where the transfer plate 330 includes ribs 900. The ribs are molded into the frame of the transfer plate in a direction of the intended air flow and provide to support for the transfer media. FIG. 9b shows transfer plate having an alternative rib pattern that adjusts the flow path of the air. Alternative rib patterns could be utilized to adjust flow paths and lengths.

Figure 10A:
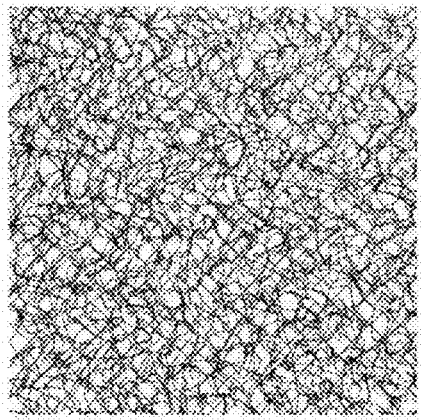
FIG. 10a shows a support media.
Figure 10B:
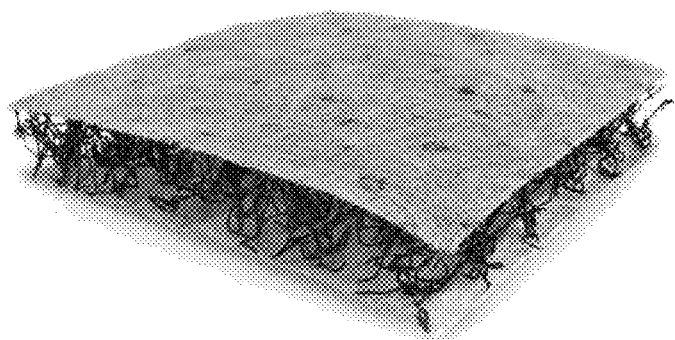
FIG. 10b shows the support media between two layers of transfer media.

FIG. 10a shows a spacing material. FIG. 10b shows an embodiment where the spacing material is provided to support the transfer media between each layer of transfer plate and sealing plate. The spacing material is an extremely porous spun bond thermoplastic polymer structure that provides support to the transfer media while also providing a turbulent flow path to help distribute the varying flow streams across the transfer media mechanically separating the moisture from the air and onto the media surface. For example, the spacing material may be a plastic material or an elastomer.

An advantage of the disclosed system is that repeating inlet plates and sealing plates allows for the creation of many humidifier stack sizes to service multiple applications depending on the amount of media needed for the application. The components that make up the core will remain the same and will simple be repeated as often as necessary. For each humidifier stack size a new end cap is provided that is a suitable size. The minimum size stack comprises two end plates and one transfer plate. Transfer plates and sealing plates are added to provide a humidifier stack that is able transfer a necessary amount of moisture from the wet air to the dry air. Furthermore, the dimensions of the plates may be varied to allow the humidifier stack to fit into a motor vehicle.

The many features and advantages of the invention are apparent from the detailed specification. Thus, the appended claims are intended to cover all such features and advantages of the invention which fall within the true spirits and scope of the invention. Further, since numerous modifications and variations will readily occur to those skilled in the art, it is not desired to limit the invention to the exact construction and operation illustrated and described. Accordingly, all appropriate modifications and equivalents may be included within the scope of the invention.

Although this invention has been illustrated by reference to specific embodiments, it will be apparent to those skilled in the art that various changes and modifications may be made which clearly fall within the scope of the invention. The invention is intended to be protected broadly within the spirit and scope of the appended claims.

What is claimed is:

1. A humidifier part comprising:
    a humidifier core comprising;
    a first end plate comprising first alignment features;
    a second end plate comprising second alignment features;
    at least one sealing plate comprising a first porous media over molded with an elastomer seal and, the elastomer seal includes alignment holes;
    at least one first inlet transfer plate comprising a second porous media over molded with a polymer frame having inlets and outlets for allowing a flow of liquid or gas in a first direction on one side of the first inlet transfer plate second porous media, wherein the polymer frame includes first mating features for mating with the first alignment features, the alignment holes, or the second alignment features; and
    at least one second inlet transfer plate comprising the second porous media over molded with the polymer frame having inlets and outlets for allowing a flow of liquid or gas in a second direction on one side of the second inlet transfer plate second porous media, wherein the second inlet transfer plate polymer frame includes second mating features for mating with the first alignment features, the alignment holes, or the second alignment features;
    wherein the alignment holes in the at least one sealing plate acts as a mating feature with at least one of the first alignment features, the second alignment features, the first mating features, and the second mating features;
    wherein the humidifier core comprises a stack of the first end plate, a first sealing plate stacked on the first end plate, a first inlet transfer plate stacked on the first sealing plate and the first alignment features orient the first inlet transfer plate to enable a flow of gas or liquid in the first direction, a second sealing plate stacked on the first inlet transfer plate, a second inlet transfer plate stacked on the second sealing plate and the second alignment features orient the second inlet transfer plate to enable a flow of gas or liquid in the second direction substantially perpendicular to the first direction, a third sealing plate stacked on the second inlet transfer plate, and the second end plate stacked on the third sealing plate.

2. A humidifier part according to claim 1, wherein the first inlet transfer plate receives a flow of wet air, the second inlet plate receives a flow of dry air, and the first porous media and the second porous media transfer moisture from the wet air to the dry air.

3. A humidifier part according to claim 1, wherein the first inlet transfer plate receives a flow of dry air, the second inlet plate receives a flow of wet air, and the first porous media and the second porous media transfer moisture from the wet air to the dry air.

4. A humidifier part according to claim 1, further comprising:
    a support media provided between the first sealing plate and the first inlet transfer plate, between the first inlet transfer plate and the second sealing plate, between the second sealing plate and the second inlet transfer plate, and between the second inlet transfer plate and the third sealing plate.

5. A humidifier part according to claim 4, wherein the support media comprises a porous spun bond thermoplastic polymer configured to provide a turbulent flow path to help distribute a stream of liquid or gas.

6. A humidifier part according to claim 1, wherein the first inlet transfer plate further comprises a plurality of media support structures molded into the first inlet transfer plate polymer frame.

7. A humidifier part according to claim 6, wherein the plurality of media support structures comprise a plurality of ribs oriented in the first direction.

8. A humidifier part according to claim 7, wherein the plurality of ribs have a pattern configured provide a turbulent flow path to help distribute a stream of liquid or gas.

9. A humidifier part according to claim 1, wherein the elastomer seal comprises a thermoplastic elastomer seal configured to seal between the first inlet plate and the second inlet plate.

10. A humidifier part according to claim 1, wherein the alignment holes are arranged to that at least one first transfer plate can only be oriented to allow liquid or gas flow in the first direction and at last one second transfer plate can only be oriented to allow liquid or gas to flow in the second direction.

11. A humidifier part according to claim 1, wherein the first inlet transfer plate frame comprises a thermoplastic polymer having snap fit features configured to mate the first inlet transfer plate frame with at least one second inlet transfer plate frame with at least one seating plate elastomer seal captured therebetween.

12. The humidifier part according to claim 1, further comprising: at least one inlet cap having an inlet end port; and
at least one outlet cap having an outlet end port, wherein the inlet end cap and the outlet end cap are attached to humidifier core.

13. The humidifier part according to claim 12, wherein the at least one inlet end cap is attached to the humidifier core by welding process.

14. The humidifier part according to claim 13, wherein the welding process comprises one of hot plate welding, vibration welding, ultrasonic welding, and hot gas welding.

15. A humidifier part comprising:
a humidifier core located within a space of a hollow shell, wherein the humidifier core comprises;
a first end plate comprising first alignment features;
a second end plate comprising second alignment features;
a plurality of sealing plates, each sealing plate comprising a first porous media over molded with an elastomer seal and alignment holes; at least two first inlet transfer plates comprising a second porous media over molded with a polymer frame having inlets and outlets for allowing a flow of liquid or gas in a first direction on a side of the first inlet transfer plate second porous media, wherein the polymer frame includes first mating features for mating with the first alignment features, the alignment holes, or the second alignment features; and
at least two second inlet transfer plates comprising the second porous media over molded with the polymer frame having inlets and outlets for allowing a flow of liquid or gas in a second direction on a side of the second inlet transfer plate second porous media, wherein the second inlet transfer plate polymer frame includes second mating features for mating with the first alignment features, the alignment holes, or the second alignment features;
wherein the alignment holes in the at least one sealing plate acts as a mating feature with at least one of the first alignment features, the second alignment features, the first mating features, and the second mating features;
wherein the humidifier core comprises a stack of the first end plate, a first sealing plate stacked on the first end plates, a first inlet transfer plate stacked on the first sealing plate and the first alignment features orient the first inlet transfer plate to enable a flow of gas or liquid in the first direction, a second sealing plate stacked on the first inlet transfer plate, a second inlet transfer plate stacked on the second sealing plate and the second alignment features orient the second inlet transfer plate to enable a flow of gas or liquid in the second direction perpendicular to the first direction, a third sealing plate stacked on the second inlet transfer plate, another first transfer plate stacked on the third sealing plate, a fourth sealing plate stacked on the another first transfer plate, another second transfer plate stacked on the fourth sealing plate, a fifth sealing plate stacked on the another second transfer plate, and the second end plate stacked on the fifth sealing plate.

* * * * *